United States Patent

Bohner et al.

[11] Patent Number: 5,896,942
[45] Date of Patent: Apr. 27, 1999

[54] STEERING APPARATUS FOR A MOTOR VEHICLE

[75] Inventors: Hubert Bohner, Böblingen; Martin Moser, Fellbach, both of Germany

[73] Assignee: Mercedes-Benz AG, Stuttgart, Germany

[21] Appl. No.: 08/872,391

[22] Filed: Jun. 10, 1997

[30] Foreign Application Priority Data

Jun. 26, 1996 [DE] Germany ............................ 196 25 503

[51] Int. Cl.⁶ .................................................. B62D 5/00
[52] U.S. Cl. ............................ 180/402; 180/421; 180/444
[58] Field of Search ................................... 180/414, 415, 180/402, 403, 421, 422, 443, 444, 446; 74/570

[56] References Cited

U.S. PATENT DOCUMENTS

| | | | |
|---|---|---|---|
| 2,782,672 | 2/1957 | Davis | 85/5 |
| 2,883,878 | 4/1959 | Landgreen | 74/496 |
| 4,705,130 | 11/1987 | Fukunaga et al. | 180/402 |
| 4,860,844 | 8/1989 | O'Neil | 180/402 |
| 4,865,144 | 9/1989 | North | 180/402 |
| 4,898,074 | 2/1990 | Roehringer . | |
| 4,984,646 | 1/1991 | Sano et al. | 180/402 |
| 5,097,917 | 3/1992 | Serizawa et al. | 180/402 |
| 5,709,281 | 1/1998 | Sherwin et al. | 180/446 |

FOREIGN PATENT DOCUMENTS

| | | |
|---|---|---|
| 4241849A1 | 6/1994 | Germany . |
| 19539101C1 | 2/1997 | Germany . |
| 816946 | 7/1959 | United Kingdom . |
| 1132497 | 2/1965 | United Kingdom ................ 180/402 |
| 2306418 | 5/1997 | United Kingdom . |

Primary Examiner—Anne Marie Boehler
Assistant Examiner—Michael Cuff
Attorney, Agent, or Firm—Evenson, McKeown Edwards & Lenahan P.L.L.C.

[57] ABSTRACT

A steering apparatus includes a user-actuable steering-angle input device with an associated steering shaft, a steering-angle setting device coupled nonmechanically to the steering-angle input device and a reaction torque device which is coupled to the steering shaft. The reaction torque device produces a reaction torque mechanically and has at least one element which can be deflected elastically in a linear manner and is coupled to the mechanism by a driver unit acting axle steering shaft. In certain embodiments, a steering-shaft pinion and a rack which is coupled to the latter serves as a piston rod for at least one piston that can be deflected elastically in a linear manner. The at least one piston is guided in axially moveable fashion in a cylinder and, together with the piston rod, forms the driver unit. Alternatively, the mechanism can contain an eccentric disc which is coupled rotatably to the steering shaft and against the outer circumference of which there rests the end of a piston rod of a piston guided in axially moveable fashion in a cylinder.

19 Claims, 6 Drawing Sheets

STEERING APPARATUS FOR A MOTOR VEHICLE

BACKGROUND AND SUMMARY OF THE INVENTION

This application claims the priority of German application 196 25 503.1-21 filed on Jun. 26, 1996, the disclosure of which is expressly incorporated by reference herein.

The invention relates to a steering apparatus for motor vehicles of the type with a nonmechanical coupling of a steering angle setting device and a steering angle input device.

Compared with conventional steering apparatuses with mechanical coupling between the steering-angle input device and the steering-angle setting device, the steering apparatuses with nonmechanical coupling between these two devices lack direct mechanical transmission of a reaction torque from the steering-angle setting device to the steering-angle input device. In order to maintain this feedback information, with which the driver of the vehicle is familiar, for steering apparatuses with nonmechanical coupling between the steering-angle input device and the steering-angle setting device, it is known practice to couple to the steering shaft a device which produces a reaction torque. Thus, German Patent Document DE-A1 42 41 849 discloses a steering system for vehicles or ships with a steering wheel having an associated steering shaft and a steering-angle setting device coupled electrically therewith, in which the steering shaft can be subjected by means of a torque-loading unit to a reaction torque that can be set as a function of the speed and/or operator's intention.

In the earlier German Patent Application 195 39 101.2, which is not a prior publication, a description is given of a steering apparatus of the type stated at the outset in which the device which produces a reaction torque comprises a return-spring arrangement, on the one hand, and a motor coupled to the steering shaft, on the other. In one exemplary embodiment, the return-spring arrangement comprises two helical compression springs arranged transversely to the steering shaft and a driver plate, arranged between them, which is coupled to the steering shaft by a mechanism. In another example, a piston-cylinder unit coaxial to the steering shaft is provided and its U-shaped piston is pressed by a helical compression spring surrounding the steering shaft against a slotted plate seated on the steering shaft in a manner fixed against rotation. In its opposite end region, the piston delimits, together with the cylinder, a working space which can be filled with a pressure fluid.

A technical problem underlying the invention is to provide a novel steering apparatus of the type stated at the outset which is optimized as regards the production of a reaction torque and compact construction.

The invention solves this problem by providing a steering apparatus having a mechanism which couples the device which produces a reaction torque mechanically to the steering shaft, which mechanism contains a steering-shaft pinion and a rack which is coupled to the latter and serves as a piston rod for at least one piston, which is guided in axially moveable fashion in a cylinder and, together with the piston rod, forms the driver unit by means of which the element that can be deflected elastically in a linear manner is coupled to the mechanism. This design of the mechanism permits compact construction of the system comprising the steering-angle input device and the device which produces a reaction torque mechanically, and permits the setting of any desired transmission ratio. In motor vehicles with an adjustable steering wheel, the compact construction of this system has the advantage that it does not restrict to any significant extent the foot space as a pivotally mounted steering shaft is pivoted. Moreover, this mechanism allows the setting of a rising reaction torque even in the case of steering angles which go beyond 360°.

In the case of certain preferred embodiments, the steering apparatus is developed such that the device which produces a reaction torque mechanically is positioned in a compact manner. Symmetrically, transverse to the steering shaft, a rack serving as a common piston rod for two pistons situated opposite one another is provided, of which one piston is in all cases taken along by the movement of the rack, depending on the steering direction, i.e. depending on whether the steering shaft has been deflected in one direction of rotation or the other out of its central position.

In certain preferred embodiments, the steering apparatus is developed such that the device which produces a reaction torque mechanically contains two pistons which are accommodated in a cylinder and against each of which the helical compression spring as the element that can be deflected elastically in a linear manner is supported. In a further development in this context, the cylinder is arranged next to the steering shaft with its longitudinal axis parallel to the steering shaft, this arrangement advantageously limiting the installation space required transverse to the steering shaft.

In the case of a further development of preferred embodiments of a steering apparatus according to the invention, a respective spring stop element is provided as a coupling element between the rack and the piston, and this spring stop element can replace a torsionally elastic coupling between a steering wheel and a steering shaft and contribute to noise damping.

In the case of certain preferred embodiments of the steering apparatus, the mechanism contains an eccentric disc which is coupled rotatably to the steering shaft and against the outer circumference of which there rests one end of a piston rod of a piston which is guided in axially moveable fashion in a cylinder and, together with the piston rod, forms the driver unit for coupling to the mechanism the element—of which there is at least one—which can be deflected elastically in a linear manner. The desired transmission characteristic between the rotary motion of the steering shaft and the linear motion of the element that can be deflected elastically in a linear manner can be set by a suitable choice of the shape of the eccentric disc and of the transmission ratio of the mechanism.

In the case of a steering apparatus developed in accordance with certain preferred embodiments, the piston delimits in the cylinder at least one working space, which can be filled with a pressure fluid. By appropriate pressurization with pressure fluid, a pressure force which is added to or subtracted from the elastic force of the element that can be deflected elastically in a linear manner can be produced in order to set a desired reaction-torque characteristic.

In the case of certain preferred embodiments of a steering apparatus, a device which produces a reaction torque electrically and has a motor is provided in addition and, specifically, is designed in such a way that the total reaction torque produced counteracts the respective change in the steering angle in a constant manner in a low speed range and counteracts a respective increase in the steering angle in a constant manner in a high speed range. This has the effect that, at low speeds of travel, the driver has to exert a steering torque of approximately the same magnitude when steering back in the direction of the straight-ahead position as when turning the steering by a relatively large amount, while, in the high speed range, automatic return of the steering to the straight-ahead position is assisted.

Other objects, advantages and novel features of the present invention will become apparent from the following detailed description of the invention when considered in conjunction with the accompanying drawings.

DETAILED DESCRIPTION OF THE DRAWINGS

Figure 1:
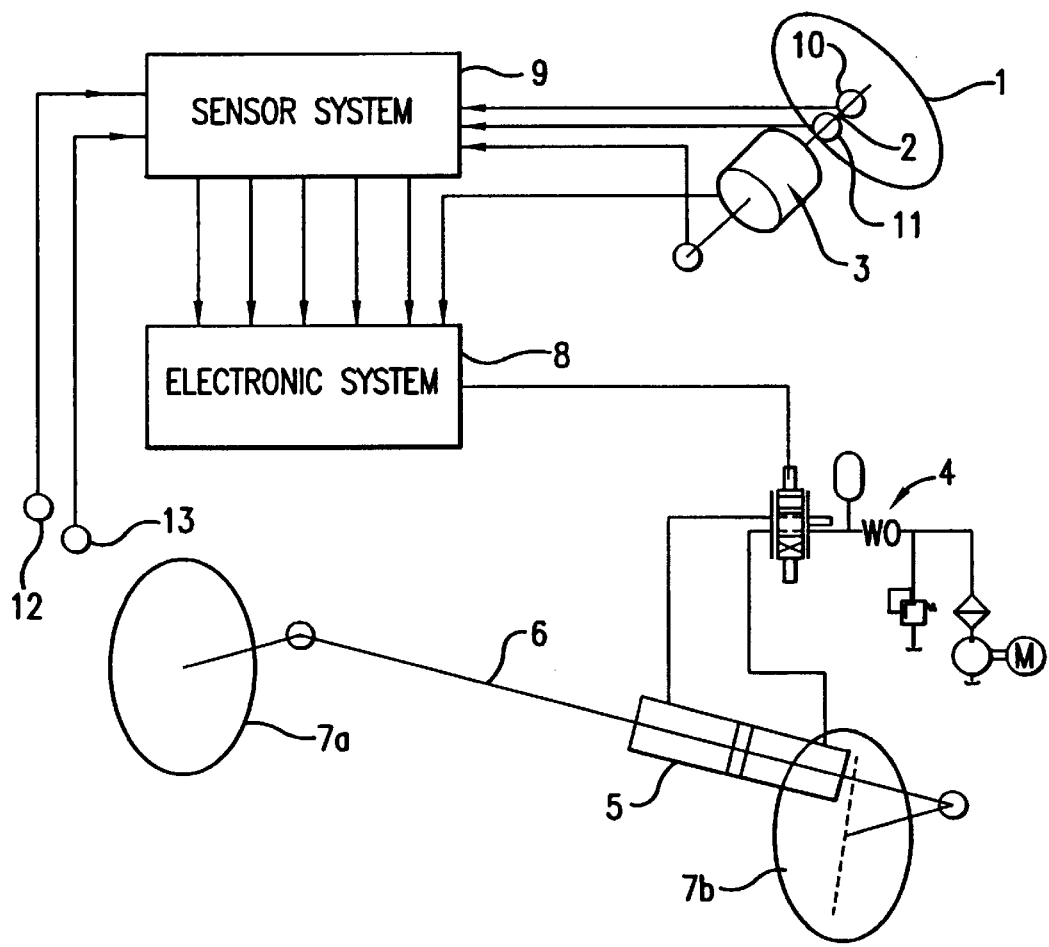
FIG. 1 shows a schematic block diagram representation of a steering apparatus for a motor vehicle with electronic coupling between a steering-angle input device and a steering-angle setting device and with a device which produces a reaction torque, constructed according to preferred embodiments of the invention.

FIG. 1 shows an overall view of a steering apparatus for a motor vehicle with nonmechanical electrical coupling between the steering-angle input device and the steering-angle setting device. The steering-angle input device comprises a steering wheel (1) with a steering shaft (2) coupled to it, and a system (3) for producing a reaction torque on the steering shaft (2). The steering-angle setting device comprises a hydraulic servo system (4) and an associated piston-cylinder servo unit (5), to which a steering gear (6) for the front wheels (7a, 7b) of the vehicle is coupled. The conventional steering column as a mechanical connection between the steering-shaft jacket tube and the steering gear (6) is omitted. Instead, the information is transmitted by way of the respective rotational position of the steering shaft to an electronic control unit (8) which drives the hydraulic servo system (4) for setting the associated steering angle, i.e. here the angle of the front wheels (7a, 7b). Further input information required by the control unit (8) is fed to it by a sensor unit (9) which receives measurement signals from various measuring elements, such as that from a sensor (10) for measuring the steering-wheel angle, that from a sensor (11) for measuring the steering-wheel torque, that from a wheel-angle sensor (12) and that from a wheel-speed sensor (13). While a customary conventional structure can be chosen for the other components mentioned, various implementations in accordance with the invention of the steering-angle input device and, in particular of the system (3) for producing a reaction torque will be explained in greater detail below.

Figure 2:
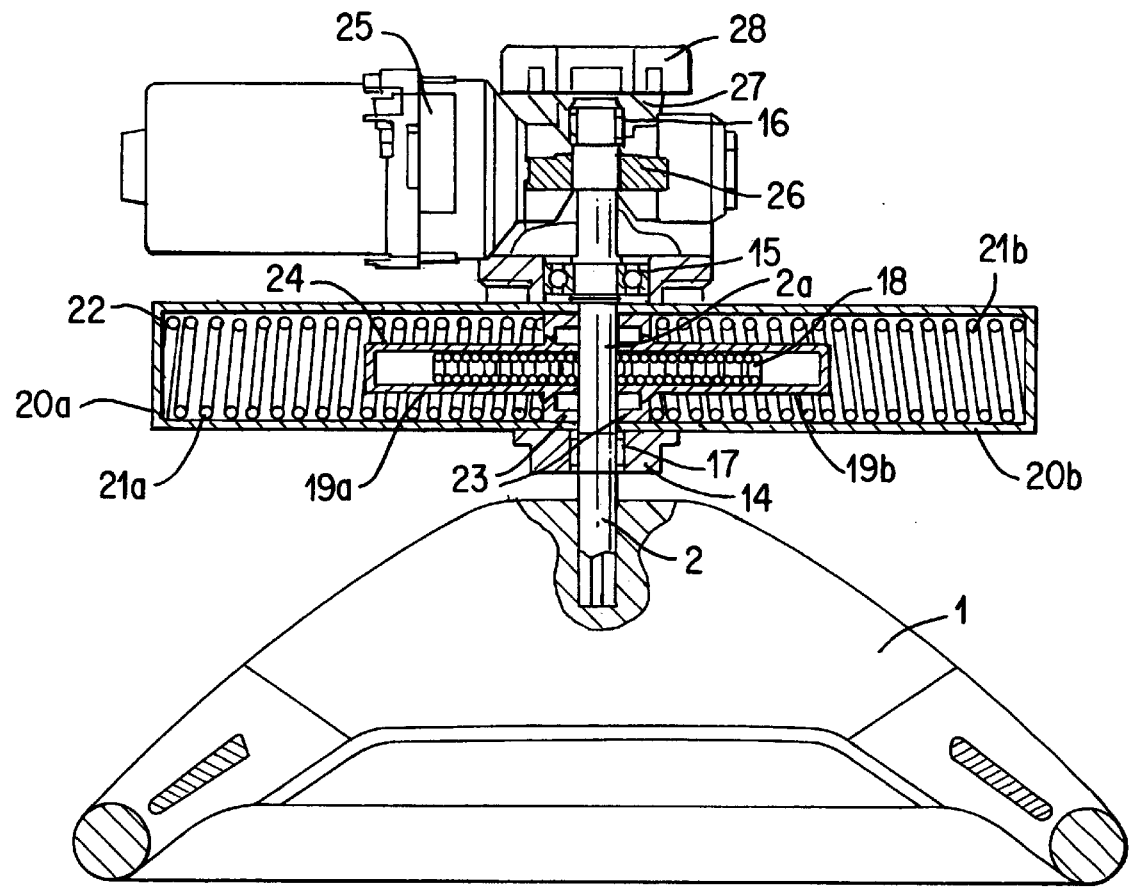
FIG. 2 shows a longitudinally sectioned view of a steering-angle input device with a transversely mounted double-cylinder piston device which produces a reaction torque, constructed according to a preferred embodiment of the invention.

FIG. 2 shows a first exemplary embodiment relating to this system for producing a reaction torque. Here, the steering wheel (1) is fixed in a housing (14) by way of the steering shaft (2) by means of one fixed-location bearing (15) and two floating bearings (16, 17). Over a certain length, the steering shaft is configured as a pinion (2a), with which a rack (18) extending transversely to the steering shaft interacts. The rack (18) is guided in guide channels in two U-shaped pistons (19a, 19b) which are situated on opposite sides of the steering shaft (2) and, for their part, are guided in such a way as to be capable of axial movement transversely to the steering shaft (2) in two cylinders (20a, 20b) situated on opposite sides of the steering shaft (2). The two pistons (19a, 19b) are pushed in the direction of respectively associated stops (23) in the immediate vicinity of the steering shaft (2) by respective helical compression springs (21a, 21b) which are supported at one end via respective rubber washers (22), on the base of the cylinder and, at the other end, against a piston shoulder.

Thus a motion-coupling positive engagement exists between the rack (18) and the respective piston (19a, 19b) in each case only when the steering wheel is turned to the right or left out of the central position shown, i.e. when the steering wheel is turned to the left, the piston (19a) on the left in FIG. 2 remains in its starting position against the associated stop (23), while the other piston (19b) is moved by the rack (18) counter to the force of the associated helical compression spring (21b). A similar situation applies, with the two pistons (19a, 19b) playing opposite roles, when the steering wheel is turned to the right. The respective piston resting against the stop (23) simultaneously serves to guide the rack (18). To ensure that the transition between the two pistons (19a, 19b) around the central position, i.e. the straight-ahead position of the steering, is not too hard, there is a transverse hole (24) in each piston (19a, 19b) and this hole prevents the air from escaping suddenly just before the guide in the piston (19a, 19b) makes stop contact. This measure reduces the amount of control required around the central position of the steering wheel.

In addition to this passive device producing the reaction torque mechanically, a further, active device which produces a reaction torque electrically is provided, this device comprising an electric motor (25) which is coupled by way of a worm to a gear wheel (26) connected nonpositively to the steering shaft (2). The electric motor can be operated in four-quadrant mode and is thus capable of producing driving and retarding reaction torques on the steering wheel (1) for any desired steering-angle value set. FIG. 2 also shows a steering-shaft angle sensor (28) adjoining an end cover (27), the sensor (28) recording the rotational position of the steering shaft (2) incrementally and in absolute terms.

During the operation of the steering apparatus, different reaction torques to be produced on the steering shaft (2) and hence the steering wheel (1) are specified for the electric motor (25), depending on the speed of travel, while the device which produces a reaction torque mechanically produces, by its very nature, a reaction torque which is dependent in a linear manner on the absolute value of the steering angle and, for example, in the central position of the steering wheel amounts to 3 Nm and, in the case of a maximum absolute value of the steering angle assumed of about 550° amounts to 5 Nm. In the region of low speeds of travel, the electric motor (25) is operated in such a way that the total reaction torque supplied by it together with the device which produces a reaction torque mechanically has a constant value of, for example, 3 Nm, irrespective of the steering-wheel angle, and is in each case opposite to the direction of the change in the steering-wheel angle. This means that in the direction of larger absolute values of the steering-wheel angle, the electric motor (25) produces a reaction torque which acts in the direction of smaller absolute values of the steering-wheel angle and rises linearly from zero in the central position of the steering wheel to −2 Nm at the maximum steering-wheel angle. In the case of return movements of the steering wheel, the electric motor (25) additionally compensates for the reaction torque of the mechanical device, so that, in this case, a constant reaction torque of −3 Nm acting in the direction of larger absolute values of the steering-wheel angle arises. For this purpose, the reaction torque of −6 Nm in the central position of the steering wheel supplied by the electric motor (25) rises to −8 Nm at the maximum steering-wheel angle.

In the region of high speeds of travel, on the other hand, a uniform total reaction torque of, for example, 5 Nm is set, irrespective of the direction of rotation of the steering wheel. For this purpose, the electric motor (25) compensates, to a decreasing extent as the absolute value of the steering-wheel angle increases, the action of the device which produces a reaction torque mechanically, the torque produced by it falling in a linear manner from, for example, 2 Nm in the central position of the steering wheel to zero at the maximum absolute value of the steering-wheel angle. Depending on the requirements, a sliding transition between these two reaction-torque characteristics, which are particularly advantageous for the respective speed range, can be provided in the intermediate speed range.

Figure 3:
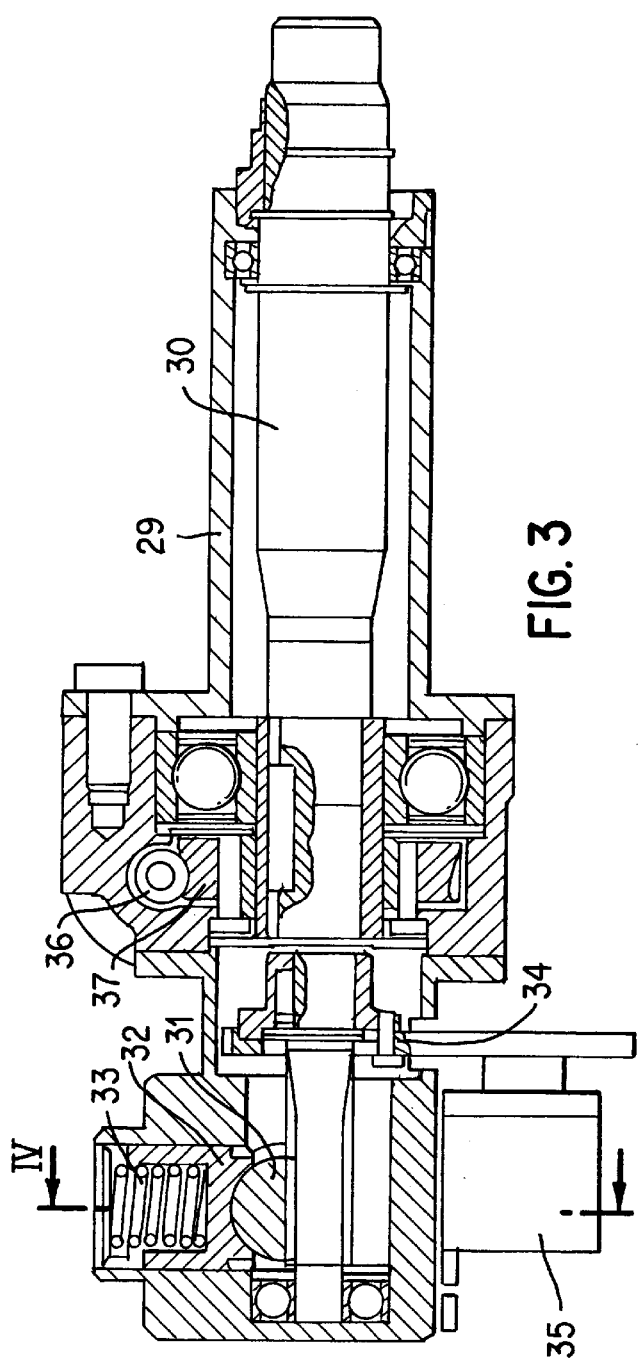
FIG. 3 shows a longitudinally sectioned view of a steering-angle input device with a transversely mounted double-piston cylinder device, constructed according to another preferred embodiment of the invention.
Figure 4:
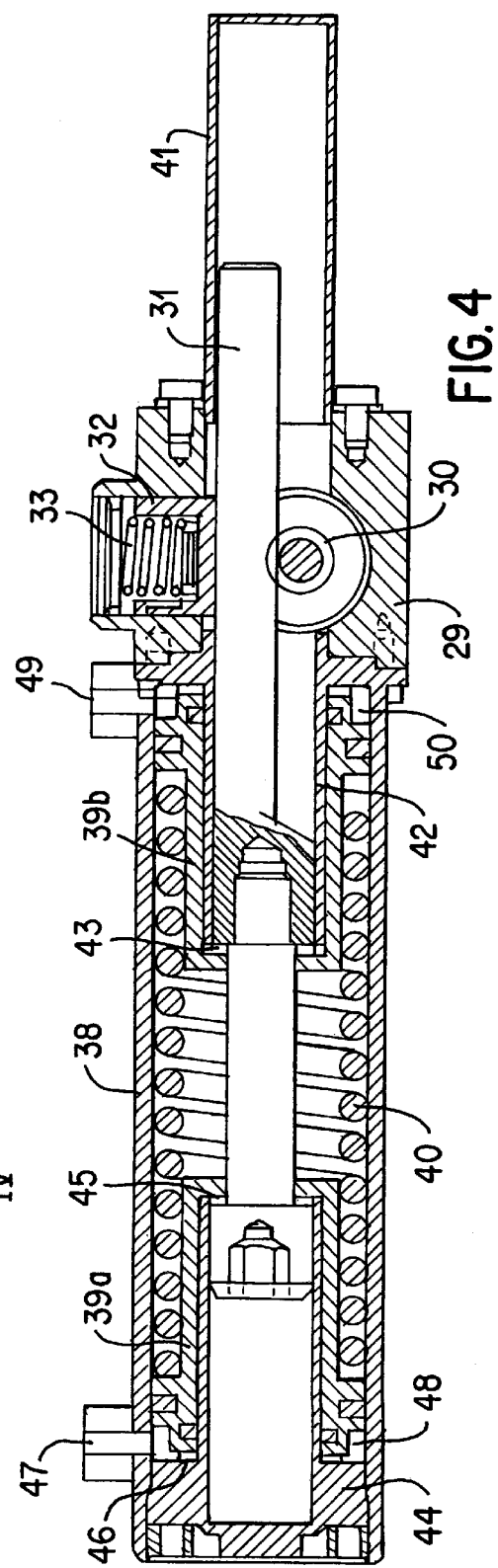
FIG. 4 shows a sectional view along the line IV—IV in FIG. 3.

FIGS. 3 and 4 show a second example of a combined device for a steering apparatus of the type shown in FIG. 1, said device producing a reaction torque mechanically and electrically. The steering shaft (30), which is guided by means of suitable bearings in a housing (29), is again configured in a certain section as a pinion with which there interacts a rack (31) which extends transverse to the steering shaft (30) and is pushed onto the steering-shaft pinion by a thrust piece (32) which is supported against the housing (29) via a compression spring (33). A sensor (35) for measuring the rotational position of the steering shaft is coupled via a gear wheel coupling (34). With a coupling similar to that in the example in FIG. 2, the shaft of an electric motor which produces a reaction torque is connected by a worm (36) and a worm wheel (37) to the steering shaft (30), the electric motor being designed here, as in all the other examples described, so as to be free from self-locking.

In this exemplary embodiment, the device which produces a reaction torque mechanically contains two U-shaped pistons (39a, 39b) which are arranged in mirror-symmetry within a cylinder (38) and which are pushed apart by a single helical compression spring (40) situated between them. The cylinder (38) is arranged on one side of the steering shaft (30) with a longitudinal axis lying transversely to the latter, a receiving sleeve (41) of sufficient length to take that part of the rack (31) which projects on the opposite side being provided on the side.

The rack (31) is coupled to both pistons (39a, 39b) as a common piston rod, and it passes through the piston (39b) on the right in FIG. 4 with a guide tube (42) being arranged in between and comes to rest axially against the end of the piston by an annular shoulder, via a plastic circlip (43) inserted in between. From there, a thinner tooth section of the rack (31) projects from the end of the cylinder and extends through the end of the other piston (39a), where it ends with an end section of larger diameter again, the latter being guided in an adjusting sleeve (44), along the outside of which the associated piston (39a) slides. The rack (31) comes to rest by means of an annular shoulder on its end section, against the end of this piston (39a) via another plastic circlip (45). The adjusting sleeve (44) is screwed into the cylinder (38), it being possible to adjust the preload of the helical compression spring (40) by changing the axial position of this sleeve. A plastic ring (46) between the adjusting sleeve (44) and the associated piston (39a) prevents these two steel components from hitting one another hard and hence serves for noise damping.

In the case of a movement of the rack to the right in FIG. 4, the righthand piston (39b) remains in its initial position, while the left-hand piston (39a) is taken along by the rack (31), compressing the helical compression spring (40). Similarly, in the case of a movement of the rack to the left, the left-hand piston (39a) remains in its initial position while the right-hand piston (39b) is displaced to the left counter to the force of the helical compression spring (40). The plastic circlips (43, 45) between the rack (31) and the respective ends of the piston have, on the one hand, a noise-damping function and, on the other hand, ensure a steep but not abrupt rise in the characteristic of the reaction torque, produced by this device, as a function the steering-wheel angle. With this function, the two circlips (43, 45) replace a torsionally elastic coupling between the steering wheel and the steering shaft (30).

In the case of the device in FIGS. 3 and 4, the production of the reaction torque can additionally be influenced by a pressure-fluid circuit with a liquid or gaseous pressure fluid. For this purpose, the cylinder (38) has a first pressure-fluid port (47), which opens into a pressure-fluid space (48) bounded, on the one hand, by the adjusting sleeve (44) and, on the other hand, by the left-hand piston (39a), and a second pressure-fluid port (49), which opens into a second working space (50) bounded, on the one hand, by the guide tube (42) and, on the other hand, by the right-hand piston (39b). When the respective working space (48, 50) is supplied with pressure fluid, a pressure force, acting on the relevant piston (39a, 39b) counter to the force of the helical compression spring (40) has the effect that the piston (39a, 39b) exerts on the rack (31) only a reaction torque reduced by the pressure force. If the pressure force exerted by the pressure fluid on the piston (39a, 39b) exceeds the force of the helical compression spring (40), the respective piston (39a, 39b) moves counter to the elastic force of the helical compression spring (40), as a result of which the movement of the rack in the corresponding direction is kept free of any reaction torque from the helical compression spring (40) over a predeterminable length, while, at the same time, the reaction torque for the opposite movement of the rack and hence of the steering wheel increases to the value of the pressure force exerted by the pressure fluid.

Otherwise, the mode of operation of this device corresponds to that in FIG. 2, to which reference can be made, with the modification that, in addition to the motor which produces a reaction torque, the pressure-fluid circuit can now be used to set the respectively desired reaction torque and, in particular, for the compensation of the pressure force of the helical compression spring (40) in the manner desired according to the situation.

Figure 5:
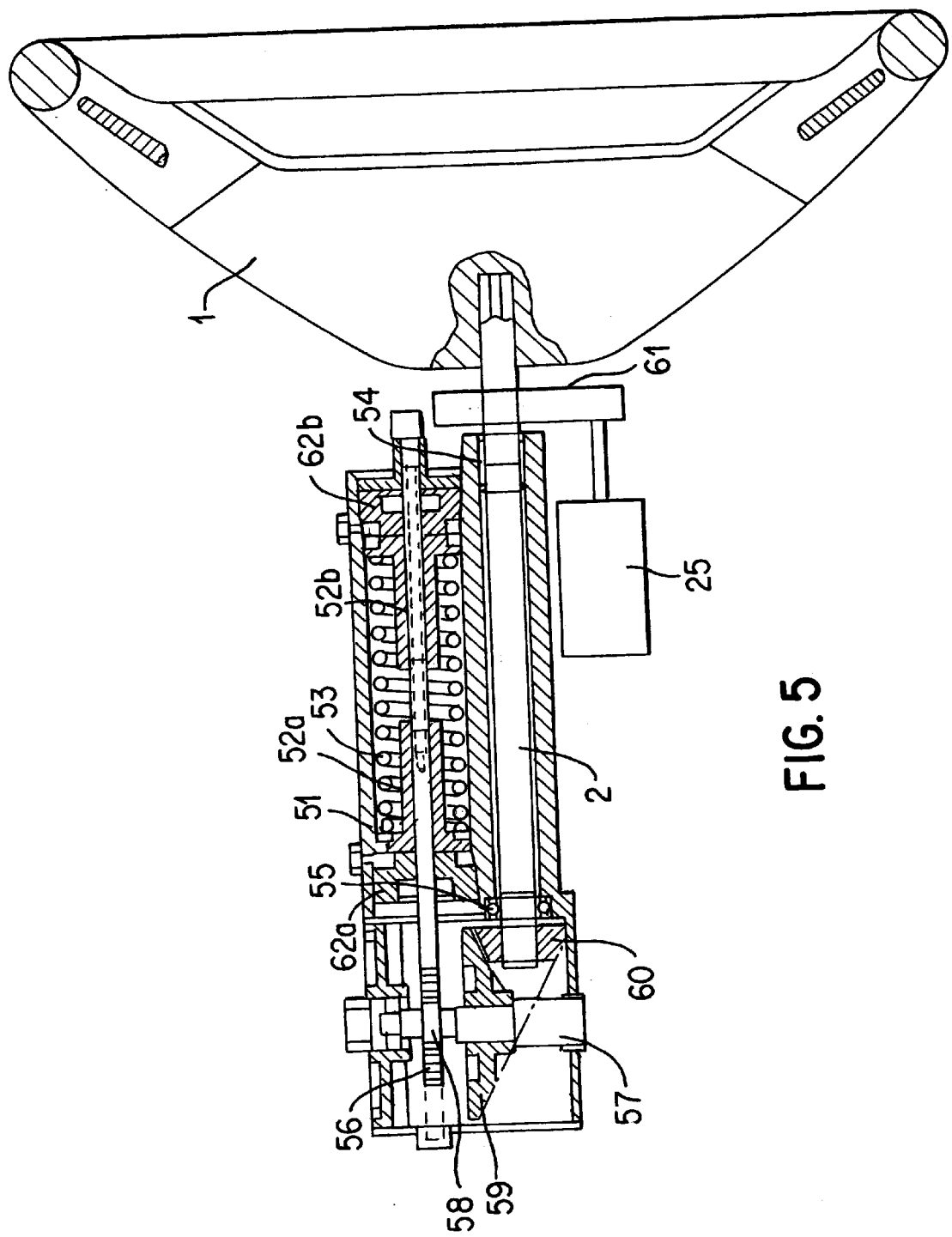
FIG. 5 shows a longitudinally sectioned view of a steering-angle input device with a longitudinally mounted double-piston cylinder device which produces a reaction torque, constructed according to another preferred embodiment of the invention.

The further exemplary embodiment, shown in FIG. 5, corresponds completely in its mode of action as regards the production of the reaction torque on the steering wheel (1) to the arrangement in FIGS. 3 and 4, but differs from this in the positioning of its components. In particular, the apparatus of FIG. 5 also contains a cylinder (51) with two pistons (52a, 52b) which are arranged in mirror symmetry therein and are guided so as to be axially moveable and are pushed apart by a helical compression spring (53). Moreover, here too, a pressure-fluid circuit corresponding to the example in FIGS. 3 and 4 is again provided in order additionally to influence the reaction-torque characteristic in the desired manner. In addition to the respective piston (52a, 52b), respective guides (62a, 62b) serve as axial boundaries of the associated pressure-fluid working space. Characteristically, however, the cylinder (51) is positioned in this apparatus next to the steering shaft (2) with its longitudinal axis parallel to the latter, the steering shaft again being mounted in suitable bearings (54, 55). In a corresponding manner, too, the rack (56) acting as a common piston rod for the two pistons (52a, 52b), extends parallel to and to the side of the steering shaft (2). The rack (56) is coupled by means of a mechanism to an intermediate shaft (57), on which there are seated in a manner fixed against relative rotation, on the one hand, a pinion (58) which interacts with the rack (56) and, on the other hand, a bevel gear (59) which meshes with a bevel gear (60) seated in a manner fixed against relative rotation on the steering shaft (2). In the apparatus shown in FIG. 5, the electric motor (25) serving as an active device which produces a reaction torque is coupled to the steering shaft (2) by a further gear mechanism (61). As can be seen from FIG. 5, this design of the system which produces a reaction torque requires a particularly small amount of installation space transversely to the steering shaft (2).

Figure 6:
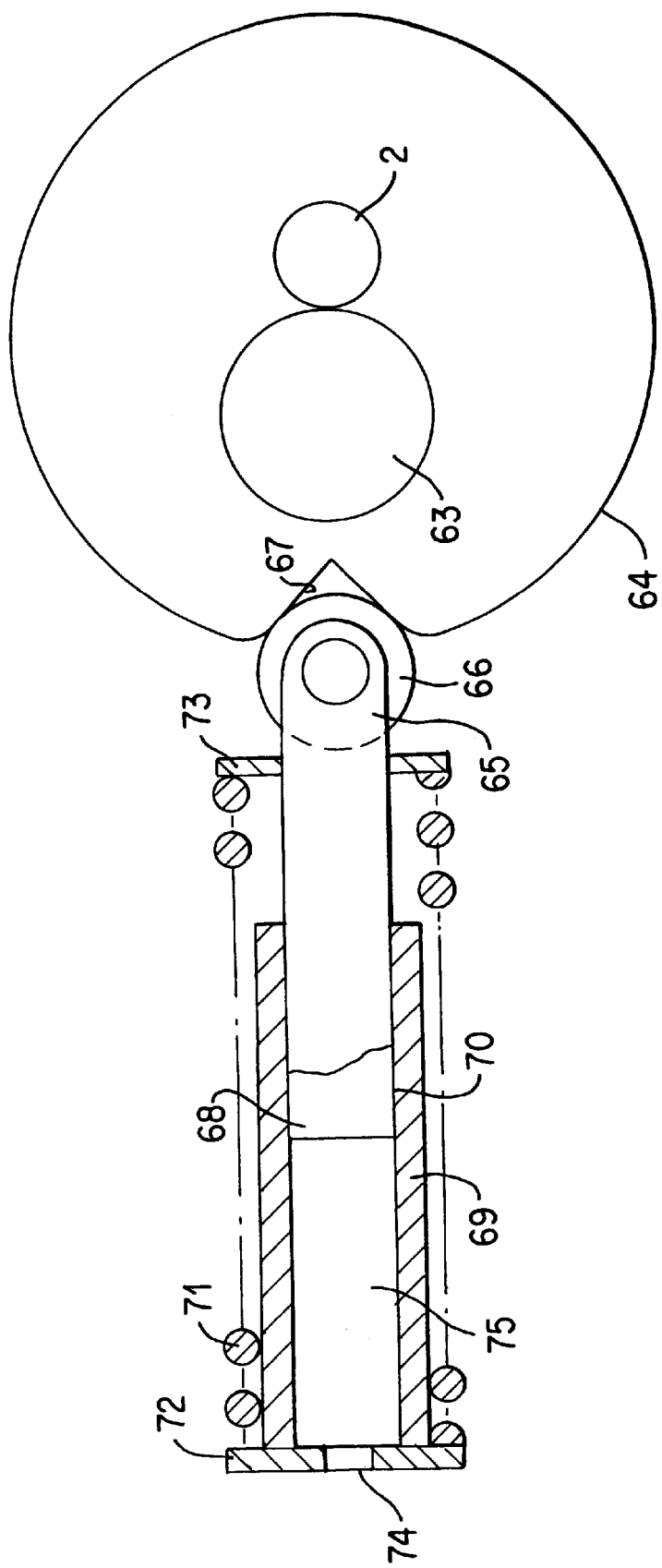
FIG. 6 shows a schematic sectional view of a steering-angle input device with a transversely mounted piston-cylinder device which has an eccentric-disc mechanism and produces a reaction torque, constructed according to another preferred embodiment of the invention.

FIG. 6 shows an exemplary embodiment in which the driver unit does not, as in the examples described above, contain a rack coupling but an eccentric-disc coupling. Stated more precisely, the purpose of coupling a device which produces a reaction torque mechanically is served in this steering apparatus by a mechanism with an intermediate shaft which extends parallel to and next to the steering shaft (2) and on which there are seated in a manner fixed against relative rotation, a gear (63) which meshes with a steering-shaft section formed as a pinion, and an eccentric disc (64). A piston rod (65) rests against and rolls on the outer circumference of the eccentric disc (64) via a rotatable roller (66), a notch (67) on the outer circumference of the eccentric disc (64) defining a latching central position of the steering wheel. With its other end region (68), the piston rod (65) forms, in an integrated design, a piston which is guided in a cylinder (69) and into which a sealing ring seal (70) is recessed. On the outside, the cylinder (69) is surrounded by a helical compression spring (71) which is supported at one end against a cylinder end flange (72) and, at the other end, against a piston-rod flange (73) and, in this way, presses the piston rod (65) against the outer circumference of the eccentric disc.

Figure 7:
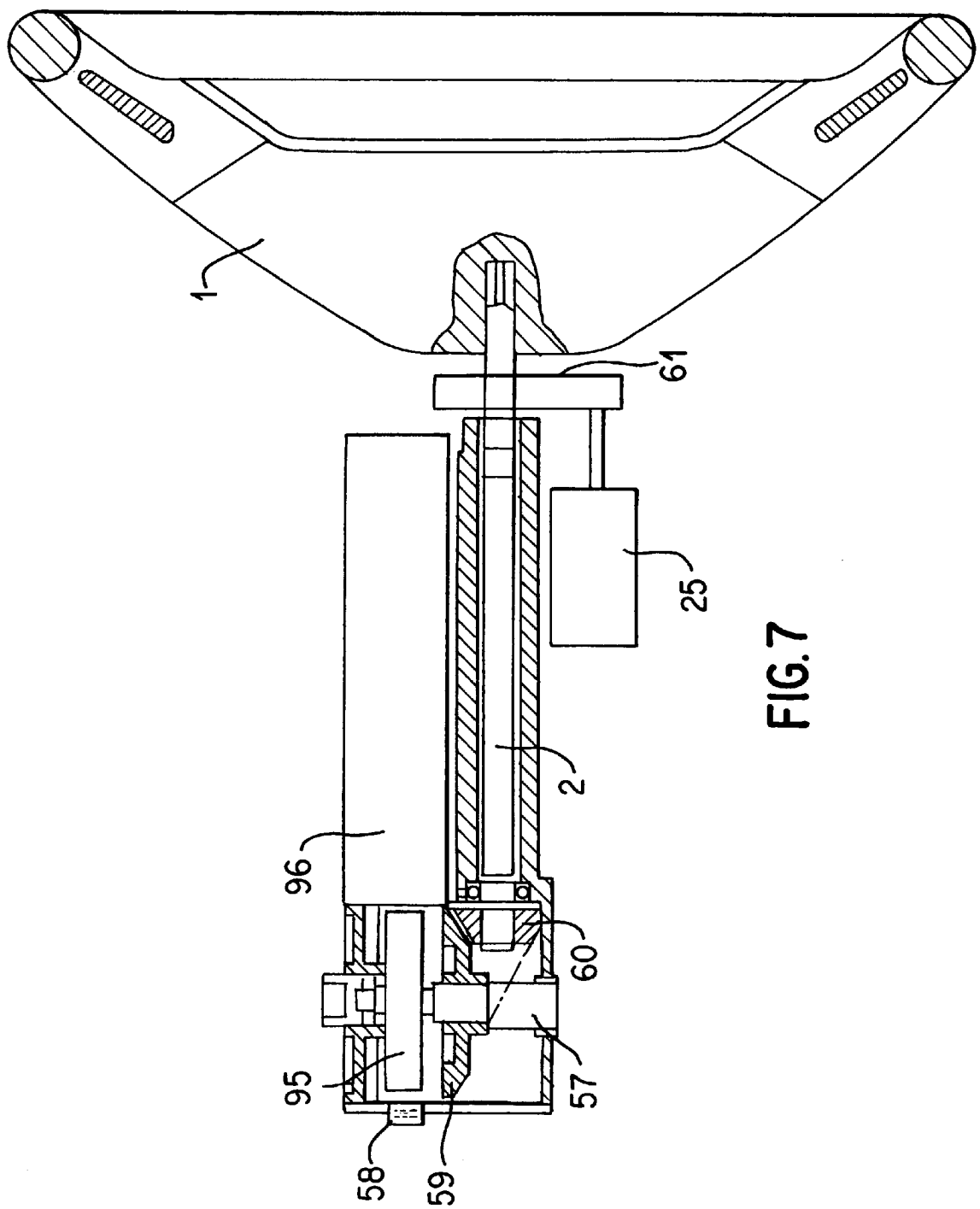
FIG. 7 shows a longitudinally sectioned view of a steering angle input device with a longitudinally mounted double-piston cylinder device which produces a reaction torque, constructed according to another preferred embodiment of the invention.

The eccentric disc (64) pushes the piston rod (65) back increasingly in both steering directions counter to the force of the helical compression spring (71) and in a symmetrical manner as the angle of rotation of the eccentric disc increases from 0° to 180°, this resulting in a corresponding increase in the reaction torque due to the helical compression spring (71). Because of the reducing design of the mechanism, there corresponds to one half rotation of the eccentric disc a significantly larger angle of rotation of the steering wheel coupled to the steering shaft (2) of, for example, over 500°, this making possible sensitive adjustment of the reaction torque as a function of the steering-wheel angle, as in the exemplary embodiments above. In addition, the reaction torque which can be produced by this device can again be influenced by means of a pressure-fluid circuit, for which purpose a pressure-fluid opening (74) leading to a working space (75) bounded by the cylinder (69) and the piston (68) formed integrally with the piston rod (65). Subjecting this working space (75) to excess pressure here brings about a reinforcement of the reaction torque in that the pressure force acts in the same sense as the force of the helical compression spring (71) on the piston rod (65). Instead of the arrangement of the piston rod (65) transversely to the steering shaft (2), as shown, parallel positioning may, of course, also be considered (see FIG. 7, wherein the eccentric disk and the mechanical reaction torque device arrangement are represented by block diagrams 95 and 96), for which purpose the mechanism can, for example, be modified by means of a bevel-gear arrangement of the type shown in FIG. 5.

The exemplary embodiments described show that the steering apparatus according to the invention comprises a device for producing a reaction torque for a steering-angle input device mechanically decoupled from the steering-angle setting device. By means of this device, it is possible to set an advantageous reaction-torque characteristic, and the device is fitted in a very compact manner and with a small space requirement in the region of the steering shaft. This is advantageous, for example, for adjustable steering-wheel arrangements in motor vehicles in which the system which produces a reaction torque is pivoted along with the steering shaft.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Steering apparatus for a motor vehicle, comprising:
   a user-actuable steering-angle input device with an associated steering shaft,
   a steering angle setting device, coupled nonmechanically to the steering angle input device, and
   a mechanical reaction torque device coupled to the steering shaft including at least one element which is deflectable elastically in a linear manner,
   wherein the mechanical reaction torque device contains a steering-shaft pinion and a rack coupled to said pinion and serving as a piston rod for at least one piston, said piston rod being guided for axial movement in a cylinder.

2. Steering apparatus according to claim 1, wherein the mechanical reaction torque device has two cylinders arranged transversely to the steering shaft and each having a piston guided in axially movable fashion in a respective one of said cylinders supported against an associated helical compression spring, and
   wherein the rack serves as a common piston rod for both pistons, one piston being taken along in one steering direction and the other piston being taken along in the other steering direction by the movement of the rack.

3. Steering apparatus according to claim 1, wherein the mechanical reaction torque device comprises a cylinder with two pistons against which a helical compression spring situated between them is supported at each end, and
   wherein the rack serves as a common piston rod for both pistons, one piston being taken along in one steering direction and the other piston being taken along in the other steering direction by the movement of the rack.

4. Steering apparatus according to claim 3, wherein the cylinder and the rack are arranged parallel to and adjacent the steering shaft, and the rack is coupled to the steering shaft by a bevel-gear arrangement.

5. Steering apparatus according to claim 3, wherein a respective spring stop element is provided as a coupling element between the rack and the piston.

6. Steering apparatus according to claim 4, wherein a respective spring stop element is provided as a coupling element between the rack and the piston.

7. Steering apparatus according to claim 3, wherein the piston delimits at least one working space in the cylinder which can be filled with a pressure fluid.

8. Steering apparatus according to claim 6, wherein the piston delimits at least one working space in the cylinder which can be filled with a pressure fluid.

9. Steering apparatus according to claim 1, comprising an electrical reaction torque device coupled to the steering shaft which produces reaction torque electrically and has a motor to produce a reaction torque in addition to that of the mechanical reaction torque device.

10. Steering apparatus according to claim 9, wherein said mechanical reaction torque device and electrical reaction torque device are configured to provide, in a low speed range, a first total reaction torque which is essentially constant irrespective the steering angle input and which provides a second different total reaction torque in a high speed range which is essentially constant, irrespective of the steering angle input, said reaction torque acting in a direction toward a central position of the steering wheel.

11. Steering apparatus for a motor vehicle, comprising:
    a user-actuable steering-angle input device with an associated steering shaft,
    a steering angle setting device, coupled nonmechanically to the steering angle input device, and
    a mechanical reaction torque device coupled to the steering shaft including at least one element which is deflectable elastically in a linear manner,
    wherein the mechanical reaction torque device is arranged substantially parallel and adjacent to the steering shaft and includes an eccentric disk coupled to the steering shaft via a bevel gear arrangement, one end of a piston rod of a piston guided in axially movable fashion in a cylinder resting against an outer circumference of the eccentric disk, said piston being elastically biased toward the eccentric disk.

12. Steering apparatus according to claim 11, comprising an electrical reaction torque device coupled to the steering shaft which produces reaction torque electrically and has a motor to produce a reaction torque in addition to that of the mechanical reaction torque device.

13. Steering apparatus according to claim 12, wherein said mechanical reaction torque device and electrical reaction torque device are configured to provide, in a low speed range, a first total reaction torque which is essentially constant irrespective the steering angle input and which provides a second different total reaction torque in a high speed range which is essentially constant, irrespective of the steering angle input, said reaction torque acting in a direction toward a central position of the steering wheel.

14. Steering apparatus for a motor vehicle, comprising:
    a user-actuable steering-angle input device with an associated steering shaft,
    a steering angle setting device, coupled nonmechanically to the steering angle input device, and
    a mechanical reaction torque device coupled to the steering shaft including at least one element which is deflectable elastically in a linear manner,
    wherein the mechanical reaction torque device is arranged substantially parallel and adjacent to the steering shaft via a bevel gear arrangement and includes an axially movable elastically biased piston rod operably resisting rotational movement of the steering shaft.

15. Steering apparatus according to claim 14, comprising an electrical reaction torque device coupled to the steering shaft which produces reaction torque electrically and has a motor to produce a reaction torque in addition to that of the mechanical reaction torque device.

16. Steering apparatus according to claim 14, wherein said mechanical reaction torque device and electrical reaction torque device are configured to provide, in a low speed range, a first total reaction torque which is essentially constant irrespective the steering angle input and which provides a second different total reaction torque in a high speed range which is essentially constant, irrespective of the steering angle input, said reaction torque acting in a direction toward a central position of the steering wheel.

17. Steering apparatus according to claim 11, wherein the eccentric disk is notched.

18. Steering apparatus according to claim 11, wherein the eccentric disk provides a latching central position for the steering angle input device.

19. Steering apparatus according to claim 11, wherein the eccentric disk is notched and provides a latching central position for the steering angle input device.

* * * * *